Patented June 26, 1934

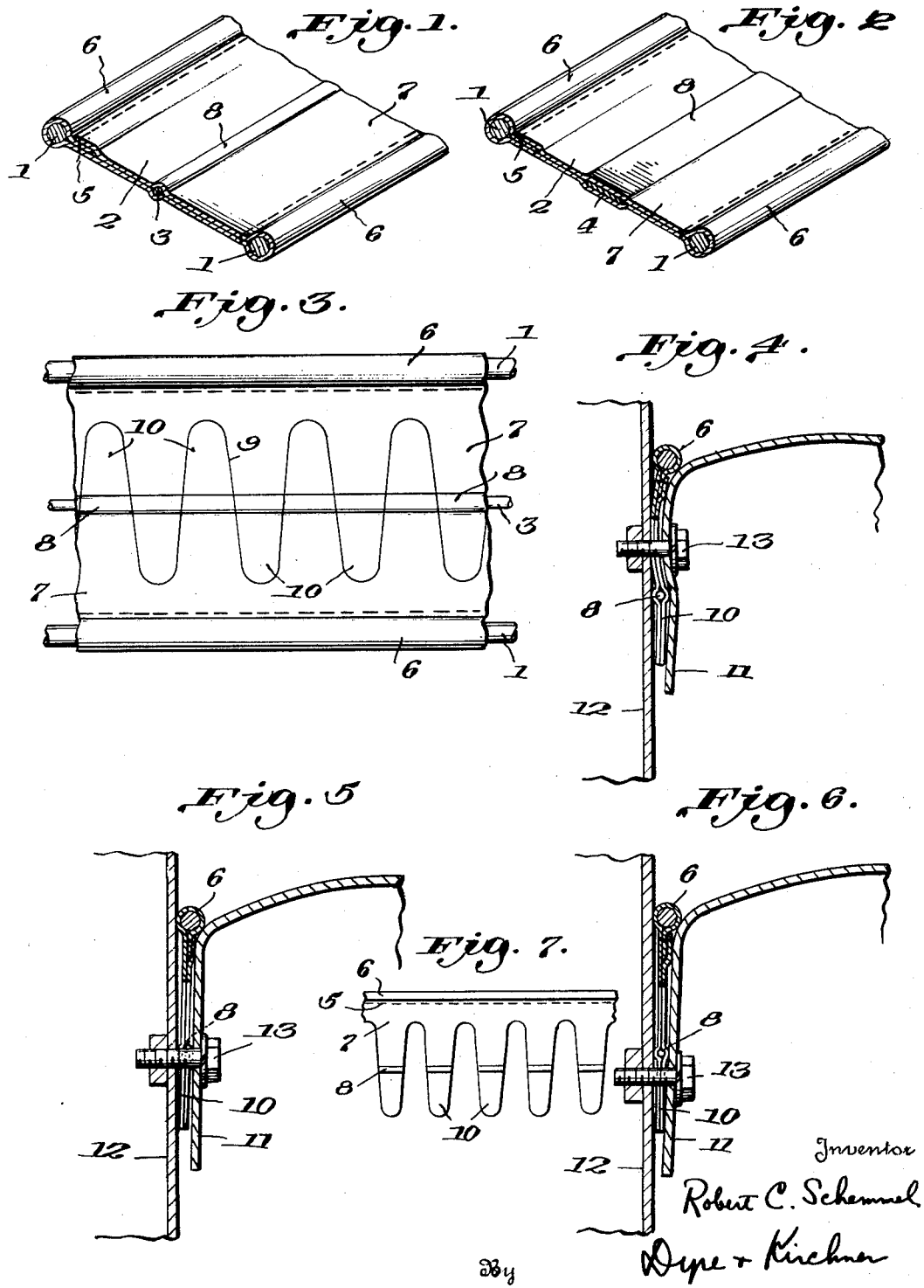

1,964,675

UNITED STATES PATENT OFFICE 1,964,675

FENDER WELT

Robert C. Schemmel, Union City, Ind.

Application July 20, 1931, Serial No. 552,024

7 Claims. (Cl. 280—152)

My invention relates to fender welts.

More particularly the invention comprises an improvement in the welts which form the subject of the United States Letters Patent No. 1,760,838 issued May 27, 1930 to Drangeid and No. 1,808,259 issued to me June 2, 1931.

The type of welt to which this invention relates comprises a strip of fabric folded upon itself to enclose a cord along one edge of the folded structure, providing an edge bead and an adjacent flange. The flange is broken along one edge to provide a series of tongues, which are adapted to be received between the adjacent areas of an automobile body and the fender attached thereto. The welt when thus installed serves to cushion the otherwise contacting portions of the body and the fender to prevent objectionable squeaks and rattling.

As is well understood by body makers, the type of fender welt to which this invention relates is installed by interposing the tongued flange of the welt between the body and the fender in such a way that the bolts or equivalent elements used to secure the fender to the body pass between adjacent tongues of the welt flange. This expedient, as explained in my prior patent above identified, obviates the necessity of preforming the welt flange with special bolt holes at exactly spaced intervals.

Prior to my present invention difficulty has been experienced in maintaining the tongued type of fender welt securely in position between the body and the fender, on account of the penetration of the fastening bolt through an open slot in the welt flange as distinguished from a round hole therein. Thus, fender welts of the tongued type produced prior to my present invention have readily separated from the body and fender consequent upon drying out and shrinkage of the flange material, loosening of the fastening bolts, failure initially to tighten the bolts to their maximum capacity, and for other reasons.

It is an object of the present invention to provide in a welt of the type indicated means for preventing ready separation of the welt flange from the cooperating parts of the automobile.

A further object is to provide a welt having a flange portion which is adapted to be maintained in operative position between the adjacent areas of the body and the fender under adverse conditions of shrinkage, bolt loosening and the like.

A further object is to provide a fender welt which may be applied with the ease and facility of the tongued welts of the prior art, and which will be retained in operative position under ordinary conditions of shrinkage, loosening, etc., as effectively as if the flange were provided with round bolt holes.

A further object is to provide a fender welt of the character indicated which may be inexpensively manufactured from a minimum of parts and relatively cheap materials.

Other and further objects and advantages of the invention will be more apparent as the description proceeds.

In the accompanying drawing which forms part of this application for Letters Patent and in which the same reference character designates the same part in the several views, Figure 1 is a perspective view with one end in section of a blank from which one form of the welt is made;

Fig. 2 is a similar view of a blank from which a modified type of welt is made;

Fig. 3 is a plan view of the blank shown in Fig. 1 immediately after the cutting operation;

Figs. 4, 5 and 6 are vertical cross sectional views of the adjacent areas of an automobile body and fender assembly showing respectively different relationships of the fender welt contemplated by the present invention and the cooperating parts of the vehicle; and Fig. 7 is a plan view on a reduced scale of a completed welt.

Referring now to the drawing and first to Figs. 1 and 2, the reference numeral 1 designates a preferably cylindrical filler element of cord, twisted paper, rubber or similar flexible material. A pair of these filler elements 1 are associated in spaced parallel relation against a strip of flexible material 2, which may be leather, textile fabric or analogous flexible material, and an additional filler is spaced substantially midway between the cords 1. In Fig. 1 an intermediate filler is shown which consists of a substantially cylindrical cord 3, generally similar to the cords 1 but preferably of somewhat smaller diameter. In Fig. 2 the intermediate filler 4 comprises a relatively narrow strip of fabric 4, of appreciable thickness. It is to be understood that any type of intermediate filler may be employed which is capable of producing, substantially midway between the fillers 1, 1, an enlargement or area of substantial thickness.

The covering material 2 is folded over the intermediate and edge fillers, and then stitched along a lap seam 5 formed adjacent to one of the fillers 1. There is thus provided a blank having a pair of beads 6, 6, disposed along longitudinal edges of an intermediate web 7 which contains a central bead or enlargement 8.

As shown in Fig. 3 the blank of Fig. 1 or Fig. 2 is adapted to be cut along an irregular line 9 of reverse curves to provide, from a single blank, a pair of complementary welts, each welt comprising a longitudinal edge bead 6 and an adjacent flange or web 7 configured with a plurality of generally flat distinct tongues 10, each tongue containing a transverse bead or enlargement 8 in spaced relation with its edge bead 6.

The welt having the characteristics explained hereinabove is applied to operative position by interposing the tongued flange 7 between the depending flange 11 of a fender and the portion of a body wall 12 against which the fender flange is received. The bead portion 6 of the welt is disposed along the upper edge of the fender flange 11, and certain pairs of adjacent tongues 10 straddle bolts or the like 13 which secure the fender to the body.

The function of the transverse bead or enlargement 8 provided in the tongues in spaced relation with the bead 6 is to prevent undesired separation of the fender welt from the fender and body. The enlargement 8 may be associated with the bolt 13 in any one of three different relationships. I prefer to pass the bolt through the tongued flange of the welt between the enlargement 8 and the edge bead 6 as shown in Fig. 4, resulting in an inconspicuous distortion of the fender flange 11 which is however sufficient to prevent movement of the enlargement 8 upwardly past bolt 13. In the alternative, the enlargement 8 may be disposed above the bolt 13, i. e., the bolt may pass through the tongued flange of the welt on the side of the enlargement 8 which is opposite the edge bead 6. Again, the bolt may pass through the tongued flange of the welt along the line of the enlargement 8, as shown in Fig. 5.

While I prefer to dispose the enlargement 8 on the bolt 13 in the relationship shown in Fig. 4, it is possible that a single installation will include two or even three of the bolt and enlargement relationships shown in Figs. 4, 5 and 6, consequent upon careless assembly, inaccurate spacing of the bolt receiving apertures provided in the body and fender, or for other reasons.

I have found in practice that when the bolt 13 is turned down moderately tight the welt is securely and permanently maintained in position, the enlargement 8 being effectively prevented from moving relatively to the adjacent areas of the body 12 and fender flange 11.

It is to be understood that the invention is capable of embodiment in other and further modified forms and that all such modifications, to the extent that they embody the principles of the invention as pointed out by the appended claims are to be deemed within the scope and purview thereof.

I claim:

1. A fender welt including an edge bead and a plurality of generally flat distinct tongues extending from a side of the bead, each tongue having a relatively narrow area of increased thickness extending transversely across the tongue in spaced relation with the bead and the free end of the tongue.

2. A fender welt including an edge bead and a plurality of generally flat distinct tongues extending from a side of the bead, all of the tongues having relatively narrow areas of increased thickness extending in alignment transversely across the tongues in spaced relation with the bead and the free ends of the tongues.

3. In combination with an automobile body and fender, a welt including an intermediate flange having an area of increased thickness interposed between the body and the fender and a bead provided at one edge of the flange and lying along an edge of the adjacent area of the body and fender, and fastening means passing through the flange securing the body and fender together and compressing the area of increased thickness whereby separation of the welt from the body and fender is prevented.

4. The combination claimed in claim 3, in which the fastening means passes through the flange between the area of increased thickness and the edge bead.

5. The combination claimed in claim 3, in which the fastening means passes through the flange on the side of the area of increased thickness opposite the edge bead.

6. The combination claimed in claim 3, in which the fastening means passes through the flange substantially at the line of the area of increased thickness.

7. In combination with an automobile body and fender having contiguous portions associated in substantial parallelism, a welt including an edge bead lying adjacent said portions, a relatively thin web adjoining the edge bead and lying between the parallel portions, and an area of increased thickness formed in the web, intermediate the free edge thereof and the edge bead and lying between the parallel portions, and means passing through the parallel portions and the web for securing the fender to the body.

ROBERT C. SCHEMMEL.